US 9,493,668 B2
Nov. 15, 2016

(12) United States Patent
Clayton et al.

(54) REVERSIBLE THERMOCHROMIC AND PHOTOCHROMIC INK PENS AND MARKERS

(71) Applicant: Chromatic Technologies, Inc., Colorado Springs, CO (US)

(72) Inventors: Terrill Scott Clayton, Colorado Springs, CO (US); Timothy J. Owen, Colorado Spirngs, CO (US)

(73) Assignee: Chromatic Technologies, Inc., Colorado Springs, CO (US)

( * ) Notice: Subject to any disclaimer, the term of this patent is extended or adjusted under 35 U.S.C. 154(b) by 0 days.

(21) Appl. No.: 14/866,485

(22) Filed: Sep. 25, 2015

(65) Prior Publication Data

US 2016/0017162 A1    Jan. 21, 2016

Related U.S. Application Data

(63) Continuation of application No. 13/737,728, filed on Jan. 9, 2013.

(60) Provisional application No. 61/732,120, filed on Nov. 30, 2012, provisional application No. 61/584,398, filed on Jan. 9, 2012.

(51) Int. Cl.

| | |
|---|---|
| *C09D 11/50* | (2014.01) |
| *C09D 11/16* | (2014.01) |
| *C09D 11/17* | (2014.01) |
| *C09D 11/18* | (2006.01) |
| *C09D 13/00* | (2006.01) |
| *C09D 5/26* | (2006.01) |
| *B41M 5/30* | (2006.01) |

(52) U.S. Cl.
CPC ............ *C09D 11/50* (2013.01); *C09D 5/26* (2013.01); *C09D 11/16* (2013.01); *C09D 11/17* (2013.01); *C09D 11/18* (2013.01); *C09D 13/00* (2013.01); *B41M 5/305* (2013.01)

(58) Field of Classification Search
CPC ....... C09D 11/16; C09D 11/17; C09D 11/18; C09D 11/20; C09D 11/50
See application file for complete search history.

(56) References Cited

U.S. PATENT DOCUMENTS

| | | | |
|---|---|---|---|
| 4,028,118 A | 6/1977 | Nakasuji et al. | |
| 4,421,560 A | 12/1983 | Kito et al. | |
| 4,425,161 A | 1/1984 | Shibahashi et al. | |
| 4,720,301 A | 1/1988 | Kito et al. | |
| 5,219,625 A | 6/1993 | Matsunami et al. | |
| 5,527,385 A | 6/1996 | Sumii et al. | |
| 5,558,700 A | 9/1996 | Shibahashi et al. | |
| 5,591,255 A | 1/1997 | Small | |
| 5,785,746 A | 7/1998 | Kito et al. | |
| 5,805,245 A | 9/1998 | Davis et al. | |
| 5,997,849 A | 12/1999 | Small et al. | |
| 6,048,387 A | 4/2000 | Shibahashi et al. | |
| 6,139,779 A | 10/2000 | Small et al. | |
| 6,494,950 B1 | 12/2002 | Fujita et al. | |
| 7,494,537 B2 | 2/2009 | Ono et al. | |
| 7,901,772 B2 | 3/2011 | Smets et al. | |
| 2003/0008774 A1 | 1/2003 | Yasuda et al. | |
| 2003/0127415 A1 | 7/2003 | Carballido | |
| 2005/0179253 A1 | 8/2005 | Rivera et al. | |
| 2006/0053975 A1* | 3/2006 | Shibahashi | B43K 5/02 81/9.2 |
| 2006/0112851 A1 | 6/2006 | Ono et al. | |
| 2007/0082977 A1 | 4/2007 | Shibahashi et al. | |
| 2007/0137521 A1* | 6/2007 | Kugel | C09D 11/17 106/31.14 |
| 2009/0143516 A1 | 6/2009 | MacDonald et al. | |
| 2011/0008095 A1 | 1/2011 | Fujita | |
| 2011/0226636 A1 | 9/2011 | Petti | |
| 2013/0177703 A1* | 7/2013 | Clayton | C09D 11/50 427/145 |

FOREIGN PATENT DOCUMENTS

| | | |
|---|---|---|
| CN | 101864209 | 10/2010 |
| EP | 0357844 | 3/1990 |
| EP | 1820662 | 8/2007 |
| EP | 2072277 | 6/2009 |
| EP | 2138550 | 12/2009 |
| GB | 1405701 | 9/1975 |
| KR | 920010717 | 12/1992 |
| WO | WO 2007/120855 | 10/2007 |

OTHER PUBLICATIONS

U.S. Appl. No. 13/737,728, filed Jan. 9, 2013.
U.S. Appl. No. 61/732,120, filed Nov. 30, 2012.
U.S. Appl. No. 61/584,398, filed Jan. 9, 2012.
International Search Report and Written Opinion in PCT International Patent Application No. PCT/US2013/020814, mailed Apr. 17, 2013, 8 pages.

* cited by examiner

*Primary Examiner* — Veronica F Faison
(74) *Attorney, Agent, or Firm* — Craig R. Miles; CR Miles P.C.

(57) ABSTRACT

Reversible thermochromic and photochromic ink compositions and markers, pens or writing instruments that use them are herein disclosed.

19 Claims, No Drawings

REVERSIBLE THERMOCHROMIC AND PHOTOCHROMIC INK PENS AND MARKERS

RELATED APPLICATIONS

This United States Patent Application is a continuation of U.S. patent application Ser. No. 13/737,728, filed Jan. 9, 2013, which claims the benefit of U.S. Provisional Patent Application No. 61/732,120, filed Nov. 30, 2012, and U.S. Provisional Patent Application No. 61/584,398, filed Jan. 9, 2012, each hereby incorporated by reference herein.

BACKGROUND

Ink is a liquid or paste that contains pigments or dyes and is used to color a surface to produce an image, text, or design. Ink is used for drawing or writing with a pen, brush, or quill. Thicker inks, in paste form, are used extensively in letterpress and lithographic printing. Conventional inks contain solvents, pigments, dyes, resins, lubricants, solubilizers, surfactants, particulate matter, fluorescers, and other materials. These materials control flow and thickness of the ink, and the appearance of the ink when dry.

Ink colorants include pigments and dyes. Pigment inks are used more frequently than dyes because they are more color-fast. Even so, pigments are often more expensive, less consistent in color, and have less of a color range than dyes. Pigments are solid, opaque particles suspended in ink to provide color. Pigment molecules typically link together in crystalline structures that are from 0.1-2 µm in size and usually comprise 5-30 percent of the ink volume. Qualities such as hue, saturation, and lightness vary depending on the source and type of pigment.

Dye-based inks may have better color development than do pigment-based inks, as they can produce more color density per unit of mass. However, because dyes are dissolved in the liquid phase, they have a tendency to soak into paper, making the ink less efficient and potentially allowing the ink to bleed at the edges of an image. To circumvent this problem, dye-based inks are made with solvents that dry rapidly or are used with quick-drying methods of printing, such as blowing hot air on the fresh print.

Chemicals that change color over a range of temperatures are known as thermochromic systems. Thermochromic chemicals can be manufactured to have a color change that is reversible or irreversible. U.S. Pat. No. 5,591,255, entitled "Thermochromic Ink Formulations, Nail Lacquer and Methods of Use", issued Jan. 7, 1997 to Small et al., discloses methods of producing thermochromic coating formulations without ingredients known to be harmful to thermochromic inks. The use of distilled water as a fountain solution for off-set printing using thermochromic ink is also disclosed.

Thermochromic systems use colorants that are either liquid crystals or leuco dyes. Liquid crystals are used less frequently than leuco dyes because they are very difficult to work with and require highly specialized printing and handling techniques. Thermochromic pigments are a system of interacting parts. Leuco dyes act as colorants, while weak organic acids act as color developers. Solvents or waxes variably interact with the leuco dyes according to the temperature of the system. As is known in the art, thermochromic systems are microencapsulated in a protective coating to protect the contents from undesired effects from the environment. Each microcapsule is self-contained, having all of the components of the entire system that are required for the color change. The components of the system interact with one another differently at different temperatures. Generally, the system is ordered and colored below a temperature corresponding to the full color point. The system becomes increasingly unordered and starts to lose its color at a temperature corresponding to an activation temperature.

Below the activation temperature, the system is usually colored. Above the activation temperature the system is usually clear or lightly colored. The activation temperature corresponds to a range of temperatures at which the transition is taking place between the full color point and the clearing point. Generally, the activation temperature is the temperature at which the human eye can perceive that the system is starting to lose color, or alternatively, starting to gain color. Presently, thermochromic systems are designed to have activation temperatures over a broad range, from about −20° C. to about 80° C. or more. With heating, the system becomes increasingly unordered and continues to lose color until it reaches a level of disorder at a temperature corresponding to a clearing point. At the clearing point, the system lacks any recognizable color.

In this manner, thermochromic pigments change from a specific color to clear upon the application of thermal energy or heat in a thermally-driven cycle exhibiting well-known hysteresis behavior. Thermochromic pigments come in a variety of colors. When applied to a substrate, such as paper, the pigment exhibits the color of the dye at the core of the microcapsules. In one example, when heat is applied generally in the range of 30 to 32° C., the ink changes from the color of the pigment to clear. When the substrate is allowed to return to a temperature under approximately 30° C., the ink returns to the original color of the pigment.

U.S. Pat. No. 5,785,746, entitled "Preparation Method for Shear-Thinning Water-Based Ball-Point Pen Inks Compositions and Ball-Point Pens Employing the Same", issued Jul. 28, 1998 to Kito et al., discloses reversible thermochromic microcapsular pigment mixed in an ink composition. The microcapsules have concavities to moderate stress resulting from an external force during use in a ball-point pen.

U.S. Pat. No. 5,805,245, entitled "Multilayered Dispersed Thermochromic Liquid Crystal", issued Sep. 8, 1998 to Davis, discloses a thermochromic substance, applied to inert films in stacked layers with a non-invasive barrier between each thermochromic substance. The thermochromic substance in each layer responds in a different temperature range so that as the temperature changes, each layer repeats a similar sequence of colors. The substrate is a water-based acrylic copolymer formulation coated or permeated with a black pigment. A transparent inert film or non-invasive barrier serves as a protective coating for the thermochromic film and as a support for the next layer of the thermochromic substance.

Specific thermochromic coating formulations are known in the art. See, for example, U.S. Pat. Nos. 4,720,301, 5,219,625 5,558,700, 5,591,255, 5,997,849, 6,139,779, 6,494,950 and 7,494,537, all of which are expressly incorporated herein by reference. These thermochromic coatings are known to use various components in their formulations, and are generally reversible in their color change. Thermochromic; pigments for use in these coatings are commercially available in various colors, with various activation temperatures, clearing points and full color points. Thermochromic coatings may be printed by offset litho, dry offset, letterpress, gravure, flexo and screen processes, amongst others.

Ink pens have previously been developed that have thermochromic inks which can be activated by frictional heat into a colorless state. The colored form of the thermochromic ink cannot be regained without considerable difficulty. For example, reversing the thermochromic transition from colorless to color has previously required difficult and burdensome conditions, such as cooling the thermochromic ink to a temperature of about below the freezing point of water. In addition to being very difficult to regain or reverse the thermochromic transition, previous colored to colorless transitions do not allow for a color to color and/or black to color transitions.

SUMMARY

Presented herein are improved and novel reversible thermochromic and photochromic ink compositions useful in pens and markers. Gel-ink and hall-ink pens disclosed herein use thermochromic and photochromic ink compositions, such as thermochromic ink that transitions from one color to another color, and/or from color to colorless.

In one embodiment, the thermochromic ink compositions disclosed herein are activated at about body temperature.

In one embodiment, the thermochromic ink compositions disclosed herein are activated at about room temperature or higher than room temperature.

In one embodiment, the present disclosure relates to compositions for reversible thermochromic and photochromic inks useful in shear-thinning ball-point pens, and a hall-point or gel-ink pen making use of the ink composition. The markers and pens using the ink compositions disclosed have eliminated the difficulties involved in conventional ball-point pen thermochromic and photochromic inks by providing thermochromic ink compositions that allow for reversible thermochromic and photochromic transitions from color to color, black to color and novel color to colorless transitions. The pens disclosed herein can give a smooth writing touch.

A reversible thermochromic composition may contain, by way of example, a reversible thermochromic pigment in an amount from 1% to 50% by weight of the ink. The reversible thermochromic pigment is susceptible to a temperature-modulated change of color between a first state and a second state along a thermally activated hysteresis loop. A non-thermochromic pigment is also provided. This may be, for example, a dye or photochromic material. The non-thermochromic pigment is of a different color from the reversible thermochromic pigment when the reversible thermochromic pigment is in a colored state, such that the non-thermochromic pigment and the reversible thermochromic pigment together present a first color when the reversible thermochromic pigment is in the first state and together present a second color when the reversible thermochromic pigment is in the second state. These pigments are mixed for substantially homogenous distribution in a vehicle as the balance of the composition. This vehicle may be formulated to present an ink for use in a ball point pen, a gel pen or a marker.

In one aspect, a thermochromic ink formulation shifts color, either reversibly or irreversibly, from one color to another color upon the application of heat to the ink or to the substrate on which the ink resides. The thermochromic ink formulation preferably includes one or more thermochromic pigments in combination with a non-thermochromic pigment.

The ink may be formulated as a gel ink, a pen ink having less viscosity than the gel ink, or as a marker ink.

The ink may be formulated such that thermochromic microcapsules are mixed with a microencapsulated photochromic dye as the non-thermochromic colorant.

DETAILED DESCRIPTION

A thermochromic ink formulation shifts from one color to another color upon the application of heat, either to the ink or to the substrate on which the ink has been applied. The thermochromic ink formulation preferably includes at least one thermochromic pigment in combination with a non-thermochromic colorant, such as a conventional pigment or dye. The non-thermochromic colorant may be any type of conventional colorant known to the art.

In some embodiments, the ink is formulated as a gel ink, substituting the colorants described herein for the colorants of a conventional gel ink. In other embodiments, the ink is formulated as a pen ink, substituting the colorants described herein for the colorants of a conventional pen ink. In other embodiments, the formulation is used in a marker, substituting the colorants described herein for the colorants of a conventional marker.

The thermochromic ink formulation includes at least two components, such that after creating an image on a substrate, e.g., paper, and upon the application of a certain amount of thermal energy, the image changes from one color to another color. The thermochromic ink formulation may include, for example, thermochromic microcapsules and a conventional pigment that differs in color from the developed color of the thermochromic pigment. The color of the thermochromic ink formulation may be the dominant, or visible, color as the ink is applied to the substrate. However, upon the application of thermal energy to the ink image, the thermochromic ink shifts from colored to clear, thereby allowing the non-dominant color of the non-thermochromic component to become visible.

In another example, a thermochromic pigment and a non-thermochromic pigment may be combined in relative proportions so that the combined color pigments create a different color altogether when the thermochromic color is developed, and a second color when the thermochromic color is not developed. For example, the developed color of the thermochromic pigment may be blue, while the color of the non-thermochromic pigment may be yellow so that, when blended, they create a green color. Then, upon the application of thermal energy, the color of the thermochromic pigment goes to clear, thus allowing the yellow of the non-thermochromic pigment to dominate as the only visible color. The result is that the color of the image goes from green to yellow when heated. The image returns to the "blended" green color when the image is allowed to cool past the color developing temperature. The blending of a color-changing thermochromic ink with a static color ink provides essentially limitless potential for the image.

Thermochromic pigments for use in formulations of the present disclosure are available commercially from a number of different manufacturers or suppliers. Manufacturers of thermochromic inks include, but are not limited to, Color Change Corporation (Streamwood, Ill., US), LCR Hallcrest (Glenview, Ill., US), Gem'innov (Gemenos, France), ISCA Limited (Newport, Wales, UK), B&H Colour Change (London, England, UK), Thermographics Measurements Limited (Flintshire, UK), Fujian Mecode Chemical Industry Company (Quanzhou, Fujian, China), and Matsui Color (Gardena, Calif., US). Distributors of thermochromic slurries include, but are not limited to, QCR Solutions Corporation (Port St. Lucie, Fla., US), Woo Jeong Ind. Inc. (Seoul, South Korea), HW Sands Corp. (Jupiter, Fla., US), Devine Chemicals (Consett, England, UK), Chemical Plus (Bangkok, Thailand), and PMC Chemicals Limited (Altrincham, England, UK).

In a preferred embodiment, a thermochromic ink formulation includes thermochromic microcapsules in the thermochromic slurry that are spherical or substantially spherical in shape and exhibit a tight particle size distribution in order to achieve a homogeneous dispersion in the thermochromic ink formulation. The thermochromic microcapsules are preferably all small or substantially all small and are more preferably all or substantially all under three micrometers in diameter. The thermochromic slurry preferably does not include flat or hemispherical microcapsules or microcapsules with surface concavities or other irregularities.

In a method of preparing a thermochromic ink formulation, a thermochromic ink formulation is used as the pigment in a conventional gel ink or a pen ink. The viscosity of the combination may be adjusted by adding compatible solvent to or removing solvent from the combination to achieve the thermochromic ink formulation. The viscosity of the thermochromic ink formulation is preferably adjusted to a predetermined value dependent upon the application for which the thermochromic ink formulation is to be used.

In some embodiments, the thermochromic ink formulation includes one or more additives, which may include, but is not limited to, one or more of a fluorescent additive, an optical brightener, and an infrared (IR) additive. In a non-limiting embodiment, the additive is used to provide a covert or an over security benefit to a substrate to which the thermochromic ink formulation is applied.

A non-thermochromic colorant is preferably mixed with a thermochromic pigment in a ratio in the range of 1:1 to 3:1 by weight. The non-thermochromic colorant is more preferably mixed with the thermochromic pigment in a ratio in the range of 1.5:1 to 2.5:1 by weight. In some embodiments, the non-thermochromic colorant is mixed with the thermochromic pigment in a ratio in the range of 1.9:1 to 2.1:1 by weight. In one embodiment of the present invention, a non-thermochromic colorant is mixed with a thermochromic pigment in a 2:1 ratio by weight.

In some embodiments, the ink is a gel fluorescent ink. In some embodiments, the color of the thermochromic pigment and the color of the non-thermochromic colorant are contrasting or complementary and create a blend color in the thermochromic ink formulation below a critical temperature, although any combination of colors may be used within the spirit of the present invention.

In other embodiments, a thermochromic ink formulation includes more than one thermochromic pigment such that at least two temperature-dependent color changes of the thermochromic ink formulation occur. The thermochromic pigments preferably have different critical temperatures such that, in the case of a thermochromic ink formulation with two thermochromic pigments, at a first temperature below the critical temperatures of both thermochromic pigments, the formulation has a first color, which is the sum of colors of the first thermochromic pigment, the second thermochromic pigment, and the non-thermochromic colorant. At a temperature above the critical temperature of the first thermochromic pigment but below the critical temperature of the second thermochromic pigment, the formulation has a second color different from the first color, which is the sum of colors of the second thermochromic pigment and the non-thermochromic colorant. At a temperature above the critical temperatures of the first thermochromic pigment and the second thermochromic pigment, the formulation has a third color different from the first and second colors, which is the color of the non-thermochromic colorant. Any number of thermochromic pigments may be combined in this manner.

In a non-limiting example, the thermochromic ink is blue, the non-thermochromic pigment is fluorescent pink, the thermochromic pigment is purple below a critical temperature, and the thermochromic ink formulation is pink above the critical temperature. In some embodiments, the process is reversible, with the thermochromic pigment returning to a purple color upon cooling below the critical temperature. In other embodiments, the color change is irreversible. The reversibility of the color change depends on the hysteresis of the color change. The reversibility of the color change is preferably selected based on the specific application for the thermochromic ink.

In the case of a thermochromic ink formulation where the color changes are reversible, the thermochromic ink formulation may be used as a visual temperature range indicator, especially when multiple thermochromic pigments are used in the formulation to indicate multiple temperature thresholds. In the case of such a thermochromic ink formulation where the color changes are irreversible, the thermochromic ink formulation may be used as a visual indicator of the maximum temperature range to which the thermochromic ink formulation has been exposed.

The critical temperature is also preferably selected based on the specific application for the thermochromic ink. In some embodiments, the critical temperature is below room temperature. In other embodiments, the critical temperature is above room temperature but below human body temperature such that the color change is triggered by human touch. In some embodiments, the critical temperature is between 25 and 37° C. In some embodiments, the critical temperature is about 31° C. In yet other embodiments, the critical temperature is above human body temperature such that another heat source is required to bring the ink to the critical temperature.

In a non-limiting example, a thermochromic pen ink formulation or a thermochromic gel ink formulation of the present invention is converted to a thermochromic marker ink formulation of the present invention by adding about 10% of water by volume to the thermochromic pen ink formulation or thermochromic gel ink formulation.

In some embodiments, a gel pen of the present invention includes a thermochromic gel ink formulation of the present invention. In some embodiments, the gel pen includes an about 8-mm ball tip. In some embodiments, the ball tip is at least 8 mm in diameter. An 8-mm diameter ball tip allows the passage of the thermochromic particles without damaging the particles for some thermochromic gel ink formulations of the present invention.

In some embodiments, a marker of the present invention includes a marker ink composition of the present invention. In some embodiments, the marker is a mechanical valve-type marker, also known as a paint marker, with a porous-type felt tip.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

Overview of Thermochromic Pigments

Reversible thermochromic and photochromic ink pens disclosed herein contain thermochromic systems that are prepared by combining a color forming molecule or molecules such as leuco dyes that are capable of extended conjugation by proton gain or electron donation; a color developer or developers that donate a proton or accept an electron; and a single solvent, or a blend of co-solvents. The solvent or blend of co-solvents are chosen based on melting point and establish the thermochromic temperature range of the system. These formulations are then microencapsulated within a polymeric shell.

These microcapsules encapsulate a thermochromic system mixed with a solvent. The thermochromic system has a material property of a thermally conditional hysteresis window that presents a thermal separation. Thermochromic encapsulated dyes undergo a color change over a specific temperature range. By way of example, a dye may change from a particular color at low temperature to colorless at a high temperature, such as red at 21° C. and colorless at above 33° C. The color change temperature is controllable, such that the color change can take place at different temperatures. In one example, the color change may occur at a temperature just below a person's external body temperature so that a color change occurs in response to a human touch or may transition at about room temperature. For example, the ideal temperature of color change may range from 12° C. to 15° C., 21° C. to 27° C., 23° C. to 27° C., 27° C. to 33° C. Custom thermochromic pigments and inks with specified colors and transition temperature ranges may be formulated and produced on commercial order from such companies as Chromatic Technologies, Inc. of Colorado Springs, Colo.

Several types of ingredients are traditionally added to ink formulations. The combination of all the ingredients in an ink, other than the pigment, is called the vehicle. The vehicle carries the pigment to the substrate and binds the pigment to the substrate. The correct combination of vehicle ingredients will result in the wetting of an ink. This wetting means that the vehicle forms an absorbed film around the pigment particles. The main ingredient in an ink is the binder. This may be a resin, lacquer or varnish or some other polymer. The binder characteristics vary depending on the type of printing that is being done and the desired final product. The second main ingredient is the colorant itself, for example, as described above. The remaining ingredients are added to enhance the color and printing characteristics of the binder and the colorant. These remaining ingredients may include reducers (solvents), waxes, surfactant, thickeners, driers, and/or ITV inhibitors.

Definitions

Activation temperature—The temperature above which the ink has almost achieved its final clear or light color end point. The color starts to fade at approximately 4° C. below the activation temperature and will be in between colors within the activation temperature range.

Ball-point pen—As referred to herein, ball-point pens and gel-ink pens are interchangeable embodiments of pen means using reversible thermochromic and photochromic ink compositions of the present disclosure. A ball-point pen may also be referred to as a marker. A ball-point pen may also be referred to as a writing instrument.

Clearing point—The temperature at which the color of a thermochromic system is diminished to a minimal amount and appears to lose no further color density upon further heating.

Full color point—The temperature at which a thermochromic system has achieved maximum color density upon cooling and appears to gain no further color density if cooled to a lower temperature.

A gel ink, as used herein, refers to a fluid composition including a pigment suspended in a based gel. Gel inks typically have a higher viscosity than pen inks and can have a higher concentration of pigment. Gel inks are available in a wide variety of colors, including, but not limited to, pastel colors, bright colors, metallic colors, glittery colors, and opalescent colors. The pigments in a gel ink are generally not in a dissolved state.

Gel-ink pen—As referred to herein, ball-point pens and gel-ink pens are interchangeable embodiments of pen means using reversible thermochromic and photochromic ink compositions of the present disclosure. A gel-ink pen may also be referred to as a marker. A gel-ink pen may also be referred to as a writing instrument.

Hysteresis—The difference in the temperature profile of a thermo chromic system when heated from the system when cooled.

Hysteresis window—The temperature difference in terms of degrees that a thermochromic system is shifted as measured between the derivative plot of chroma of a spectrophotometer reading between the cooling curve and the heating curve.

A marker, as used herein, refers to any writing instrument with a porous tip or felt tip made of a fibrous material for delivering ink.

A pen, as used herein, refers to any non-marker, ink-based writing instrument including, but not limited to, ball-point pens, roller-ball pens, and fountain pens.

A pen ink, as used herein, refers to a fluid or gel composition including a pigment and a carrier or vehicle in which the pigment is suspended. In some embodiments, the vehicle is water. In other embodiments, the solvent is a non-aqueous solvent, such as an organic solvent such as alcohol. Photochromic ink—A mixture of dyes, solvents, and additives (encapsulated or non-encapsulated) that can undergo reversible color change in response to exposure to light of various wavelengths.

Thermochromic system—A mixture of dyes, developers, solvents, and additives (encapsulated or non-encapsulated) that can undergo reversible color change in response to temperature changes.

Thermochromic ink—An ink that contains a pigment formed of a mixture of dyes, developers, solvents, and additives that are encapsulated and can undergo reversible color change in response to temperature changes. The color change is based upon the action of microencapsulated leuco dyes and developers, which are referred to herein as thermochromic pigments. Thermochromic pigments may be sold as dry powders or in water-based slurries of encapsulated dye.

Leuco dye—A leuco dye is a dye whose molecules can acquire two forms, one of which is colorless.

Thermochromic Inks

Thermochromic inks useful in ball-point pens and gel-ink pens contain microcapsules, which encapsulate a thermochromic system mixed with a solvent. The thermochromic system has a material property of a thermally conditional hysteresis window that presents a thermal separation. These inks may be improved according to the instrumentalities described herein by using a co-solvent that is combined with the thermochromic system and selected from the group consisting of derivatives of mysristic acid, derivatives of behenyl acid, derivatives of palmytic acid and combinations thereof. This material may be provided in an effective amount to reduce the thermal separation in the overall ink to a level less than eighty percent of separation that would otherwise occur if the material were not added. This effective amount may range, for example from the 12% to 15% by weight of the composition.

The thermochromic system may contain, for example, at least one chromatic organic compound and co-solvents.

One example of a thermochromic system includes a leuco dye having a lactone ring structure and a phenolic developer. Within the encapsulated thermochromic systems, complexes form between the dye and the weak acid developer that allow the lactone ring structure of the leuco dye to be opened. The nature of the complex is such that the hydroxyl groups of the phenolic developer interact with the open lactone ring structure forming a supra-molecular structure that orders the dyes and developers such that a color is formed. Color forms from this supra-molecular structure because the dye molecule in the ring open structure is cationic in nature and the molecule has extended conjugation allowing absorption in the visible spectrum thus producing a colored species. The color that is perceived by the eye is what visible light is not absorbed by the complex. The nature of the dye/developer complex depends on the molar ratio of dye and developer. The stability of the colored complex is determined by the affinity of the solvent for itself, the developer or the dye/developer complex. In a solid state, below the full color point, the dye/developer complex is stable. In the molten state, the solvent destabilizes the dye/developer complex and the equilibrium is more favorably shifted towards a developer/solvent complex. This happens at temperatures above the full color point because the dye/developer complex is disrupted and the extended conjugation of the $\pi$ cloud electrons that allow for the absorption of visible light are destroyed.

The melting and crystallization profile of the solvent system determines the nature of the thermochromic system. The full color point of the system occurs when the maximum amount of dye is developed. In a crystallized solvent state, the dye/developer complex is favored where the dye and developer exist in a unique crystallized structure, often intercalating with one another to create an extended conjugated a system. In the molten state, the solvent(s), in excess, have enough kinetic energy to disrupt the stability of the dye/developer complex, and the thermochromic system becomes decolorized.

The addition of a co-solvent with a significantly higher melting point than the other dramatically changes the melting properties of both the solvents. By mixing two solvents that have certain properties, a blend can be achieved that possesses a eutectic melting point. The melting point of a eutectic blend is lower than the melting point of either of the co-solvents alone and the melting point is sharper, occurring over a smaller range of temperatures. The degree of the destabilization of the dye/developer complex can be determined by the choice of solvents. By creating unique eutectic blends, both the clearing point and the full color point can be altered simultaneously. The degree of hysteresis is then shifted in both directions simultaneously as the sharpness of the melting point is increased.

Temperature changes in thermochromic systems are associated with color changes. If this change is plotted on a graph having axes of temperature and color, the curves do not align and are offset between the heating cycle and the cooling cycle. The entire color versus temperature curve has the form of a loop. Such a result shows that the color of a thermochromic system does not depend only on temperature, but also on the thermal history, i.e. whether the particular color was reached during heating or during cooling. This phenomenon is generally referred to as a hysteresis cycle and specifically referred to herein as color hysteresis or the hysteresis window. Decreasing the width of this hysteresis window to approximately zero would allow for a single value for the full color point and a single value for the clearing point. This would allow for a reliable color transition to be observed regardless of whether the system is being heated or cooled. Nonetheless, the concept decreasing separation across the hysteresis window is elusive in practice. Thus, it is an object of the present disclosure to provide thermochromic systems with a reduced hysteresis window achieved by shifting both the full color point and the clearing point such as in memory inks, for example.

It is also an object of this disclosure to provide formulations of extended hysteresis windows in ink formulations.

Leuco Dyes

Leuco dyes most commonly used as color formers in thermochromic systems of the present disclosure include, but are not limited to, generally; spirolactones, fluorans, spiropyrans, and fulgides; and more specifically; diphenylmethane phthalide derivatives, phenylindolylphthalide derivatives, indolylphthalide derivatives, diphenylmethane azaphthalide derivatives, phenylindolylazaphthalide derivatives, fluoran derivatives, styrynoquinoline derivatives, and diaza-rhodamine lactone derivatives which can include: 3,3-bis(p-dimethylaminophenyl)-6-dimethylaminophthalide; 3-(4-diethylaminophenyl)-3-(1-ethyl-2-methylindol-3-yl) phthalide; 3,3-bis(1-n-butyl-2-methylindol-3-yl)phthalide; 3,3-bis(2-ethoxy-4-diethylaminophenyl)-4-azaphthalide; 3-[2-ethoxy-4-(N-ethylanilino)phenyl]-3-(1-ethyl-2-methylindol-3-yl)-4-azaphthalide; 3,6-dimethoxyfluoran; 3,6-di-n-butoxyfluoran; 2-methyl-6-(N-ethyl-N-p-tolylamino)fluoran; 3-chloro-6-cyclohexylanminofluoran; 2-methyl-6-cyclohexylaminofluoran; 2-(2-chloroanilino)-6-di-n-butylamino fluoran; 2-(3-trifluoromethylanilino)-6-diethylaminofluoran; 2-(N-methylanilino)-6-(N-ethyl-N-p-tolylamino) fluoran, 1,3-dimethyl-6-diethylaminofluoran; 2-chloro-3-methyl-6-diethylamino fluoran; 2-anilino-3-methyl-6-diethylaminofluoran; 2-anilino-3-methyl-6-di-n-butylamino fluoran; 2-xylidino-3-methyl-6-diethylaminofluoran; 1,2-benzo-6-diethylaminofluoran; 1,2-benzo-6-(N-ethyl-N-isobutylamino)fluoran,1,2-benzo-6-(N-ethyl-N-isoamylamino)fluoran; 2-(3-methoxy-4-dodecoxystyryl) quinoline; spiro[5H-(1)benzopyrano(2,3-d)pyrimidine-5,1' (3'H)isobenzofuran]-3'-one; 2-(diethylamino)-8-(diethylamino)-4-methyl-spiro[5H-(1)benzopyrano(2,3-d) pyrimidine-5,1'(3'H)isobenzofuran]-3'-one; 2-(di-n-butylamino)-8-(di-n-butylamino)-4-methyl-spiro[5H-(1) benzopyrano(2,3-d)pyrimidine-5,1'(3'H)isobenzofuran]-3'-one; 2-(di-n-butylamino)-8-(diethylamino)-4-methyl-spiro [5H-(1)benzopyrano(2,3-d)pyrimidine-5,1'(3'H) isobenzofuran]-3'-one; 2-(di-n-butylamino)-8(N-ethyl-N-isoamylamino)-4-methyl-spiro[5H-(1)benzopyrano(2,3-d) pyrimidine-5,1'(3'H)isobenzofuran]-3'-one; and 2-(di-n-butylamino)-8-(di-n-butylamino)-4-phenyl and trisubstituted pyridines.

Developers

Weak acids that can be used as color developers act as proton donors, changing the dye molecule between its leuco form and its protonated colored form; stronger acids make the change irreversible. Examples of developers used in the present disclosure include but are not limited to: bisphenol A; bisphenol F; tetrabromobisphenol A; 1'-methylenedi-2-naphthol; 1,1,1 l-tris(4-hydroxyphenyl)ethane; 1,1-bis(3-cyclohexyl-4-hydroxyphenyl)cyclohexane; 1,1-bis(4-hydroxy-3-methylphenyl)cyclohexane; 1,1-bis(4-hydroxyphenyl)cyclohexane; 1,3-bis[2-(4-hydroxyphenyl)-2-propyl]benzene; 1-naphthol; 2-naphthol; 2,2 bis(2-hydroxy-5-biphenylyl)propane; 2,2-bis(3-cyclohexyl-4-hydroxy)propane; 2,2-bis(3-sec-butyl-4-hydroxyphenyl)

propane; 2,2-bis(4-hydroxy-3-isopropylphenyl)propane; 2,2-bis(4-hydroxy-3-methylphenyl)propane; 2,2-bis(4-hydroxyphenyl)propane; 2,3,4-trihydroxydiphenylmethane; 4,4'-(1,3-Dimethylbutylidene)diphenol; 4,4'-(2-Ethylidene) diphenol; 4,4'-(2-hydroxybenzylidene)bis(2,3,6-trimethylphenol); 4,4'-biphenol; 4,4'-dihydroxydiphenyl ether; 4,4'-dihydroxydiphenylmethane; 4,4'-methylidenebis(2-methylphenol); 4-(1,1,3,3-tetramethylbutyl)phenol; 4-phenylphenol; 4-tert-butylphenol; 9,9-bis(4-hydroxyphenyl)fluorine; 4,4'-(ethane-1,1-diyl)diphenol; alpha,alpha'-bis (4-hydroxyphenyl)-1,4-diisopropylbenzene; alpha,alpha,alpha'-tris(4-hydroxyphenyl)-1-ethyl-4-isopropylbenzene; benzyl 4-hydroxybenzoate; bis(4-hydroxyphenyl)sulfide; bis(4-hydroxyphenyl)sulfone; propyl 4-hydroxybenzoate; methyl 4-hydroxybenzoate; resorcinol; 4-tert-butyl-catechol; 4-tert-butyl-benzoic acid; 1,1'-methylenedi-2-naphthol 1,1,1-tris(4-hydroxyphenyl)ethane; 1,1-bis(3-cyclohexyl-4-hydroxyphenyl)cyclohexane; 1,1-bis(4-hydroxy-3-methylphenyl)cyclohexane; 1,1-bis(4-hydroxyphenyl) cyclohexane; 1,3-bis[2-(4-hydroxyphenyl)-2-propyl] benzene; 1-naphthol 2,2'-biphenol; 2,2-bis(2-hydroxy-5-biphenylyl)propane; 2,2-bis(3-cyclohexyl-4-hydroxyphenyl)propane; 2,2-bis(3-sec-butyl-4-hydroxyphenyl)propane; 2,2-bis(4-hydroxy-3-isopropylphenyl)propane; 2,2-bis(4-hydroxy-3-methylphenyl)propane; 2,2-bis(4-hydroxyphenyl)propane; 2,3,4-trihydroxydiphenylmethane; 2-naphthol; 4,4'-(1,3-dimethylbutylidene)diphenol; 4,4'-(2-ethylhexylidene)diphenol 4,4'-(2-hydroxybenylide)bis(2,3,6-trimethylphenol); 4,4'-biphenol; 4,4'-dihydroxydiphenyl ether; 4,4'-dihydroxydiphenylmethane; 4,4'-ethylidenebisphenol; 4,4'-methylenebis(2-methylphenol); 4-(1,1,3,3-tetramethylbutyl)phenol; 4-phenylphenol; 4-tert-butylphenol; 9,9-bis(4-hydroxyphenyl)fluorine; alpha,alpha'-bis(4-hydroxyphenyl)-1,4-diisopropylbenzene; α,α,α-tris(4-hydroxyphenyl)-1-ethyl-4-isopropylbenzene; benzyl 4-hydroxybenzoate; bis(4-hydroxyphenyl)sulfidem; bis(4-hydroxyphenyl) sulfone methyl 4-hydroxybenzoate; resorcinol; tetrabromobisphenol A; 3,5-di-tertbutyl-salicylic acid; zinc 3,5-di-tertbutylsalicylate; 3-phenyl-salicylic acid; 5-tertbutyl-salicylic acid; 5-n-octyl-salicylic acid; 2,2'-biphenol; 4,4'-di-tertbutyl-2,2'-biphenol; 4,4'-di-n-alkyl-2,2'-biphenol; and 4,4'-di-halo-2,2'-biphenol, wherein the halo is chloro, fluoro, bromo, or iodo.
Solvents The best solvents to use within the thermochromic system are those that have low reactivity, have a relatively large molecular weight (i.e. over 100), and which are relatively non-polar. Very low molecular weight aldehydes, ketones, diols and aromatic compounds should not be used as solvents within the thermochromic system.

Thermochromic inks disclosed herein use a co-solvent that is combined with the thermochromic system and selected from the group consisting of derivatives of mysristic acid, derivatives of behenyl acid, derivatives of palmytic acid and combinations thereof. This material may be provided in an effective amount to reduce the thermal separation in the overall ink to a level less than eighty percent of separation that would otherwise occur if the material were not added. This effective amount may range, for example from the 12% to 15% by weight of the composition.

The addition of a co-solvent with a significantly higher melting point than the other dramatically changes the melting properties of both the solvents. By mixing two solvents that have certain properties, a blend can be achieved that possesses a eutectic melting point. The melting point of a eutectic blend is lower than the melting point of either of the co-solvents alone and the melting point is sharper, occurring over a smaller range of temperatures. The degree of the destabilization of the dye/developer complex can be determined by the choice of solvents. By creating unique eutectic blends, both the clearing point and the full color point can be altered simultaneously. The degree of hysteresis is then shifted in both directions simultaneously as the sharpness of the melting point is increased. Copending application Ser. No. 13/363,070 filed Jan. 31, 2012 discloses thermochromic systems with controlled hysteresis, and is hereby incorporated by reference to the same extent as though fully replicated herein. According to the instrumentalities described therein, the microencapsulate pigments may be formulated to have color transition temperatures across a hysteresis window of less than five degrees centigrade or more than 60 or 80 degrees centigrade.

Properties of at least one of the co-solvents used in the present disclosure include having a long fatty tail of between 12 and 24 carbons and possessing a melting point that is about 70° C. to about 200° C. greater than the co-solvent partner. The co-solvents are preferably also completely miscible at any ratio.

Solvents and/or co-solvents used in thermochromic generally may include, but are not limited to, sulfides, ethers, ketones, esters, alcohols, and acid amides. These solvents can be used alone or in mixtures of 2 or more. Examples of the sulfides include: di-n-octyl sulfide; di-n-nonyl sulfide; di-n-decyl sulfide; di-n-dodecyl sulfide; di-n-tetradecyl sulfide; di-n-hexadecyl sulfide; di-n-octadecyl sulfide; octyl dodecyl sulfide; diphenyl sulfide; dibenzyl sulfide; ditolyl sulfide; diethylphenyl sulfide; dinaphthyl sulfide; 4,4'-dichlorodiphenyl sulfide; and 2,4,5,4'tetrachlorodiphenyl sulfide. Examples of the ethers include: aliphatic ethers having 10 or more carbon atoms, such as dipentyl ether, dihexyl ether, diheptyl ether, dioctyl ether, dinonyl ether, didecyl ether, diundecyl ether, didodecyl ether, ditridecyl ether, ditetradecyl ether, dipentadecyl ether, dihexadecyl ether, dioctadecyl ether, decanediol dimethyl ether, undecanediol dimethyl ether, dodecanediol dimethyl ether, tridecanediol dimethyl ether, decanediol diethyl ether, and undecanediol diethyl ether; alicyclic ethers such as s-trioxane; and aromatic ethers such as phenylether, benzyl phenyl ether, dibenzyl ether, di-p-tolyl ether, 1-methoxynaphthalene, and 3,4, 5trimethoxytoluene.

Examples of ketone solvents include: aliphatic ketones having 10 or more carbon atoms, such as 2-decanone, 3-decanone, 4-decanone, 2-undecanone, 3-undecanone, 4-undecanone, 5-undecanone, 6-undecanone, 2-dodecanone, 3-dodecanone, 4-dodecanone, 5-dodecanone, 2-tridecanone, 3-tridecanone, 2-tetradecanone, 2-pentadecanone, 8-pentadecanone, 2-hexadecanone, 3-hexadecanone, 9-heptadecanone, 2-pentadecanone, 2-octadecanone, 2-nonadecanone, 10-nonadecanone, 2-eicosanone, 11-eicosanone, 2-heneicosanone, 2-docosanone, laurone, and stearone; aryl alkyl ketones having 12 to 24 carbon atoms, such as n-octadecanophenone, n-heptadecanophenone, n-hexadecanophenone, n-pentadecanophenone, n-tetradecanophenone, 4-n-dodecaacetophenone, n-tridecanophenone, 4-n-undecanoacetophenone, n-laurophenone, 4-n-decanoacetophenone, n-undecanophenone, 4-n-nonylacetophenone, n-decanophenone, 4-n-octylacetophenone, n-nonanophenone, 4-n-heptylacetophenone, n-octanophenone, 4-n-hexylacetophenone, 4-n-cyclohexylacetophenone, 4-tert-butylpropiophenone, n-heptaphenone, 4-n-pentylacetophenone, cyclohexyl phenyl ketone, benzyl n-butyl ketone, 4-n-butylacetophenone, n-hexanophenone, 4-isobutylacetophenone, 1-acetonaphthone, 2-acetonaphthone, and cyclopentyl phenyl ketone; aryl aryl ketones such as benzophenone, benzyl phenyl ketone, and dibenzyl ketone; and alicyclic ketones such as cyclooctanone, cyclododecanone, cyclopentadecanone, and 4-tert-butylcyclohexanone, ethyl caprylate, octyl caprylate, stearyl caprylate, myristyl caprate, stearyl caprate, docosyl caprate, 2-ethylhexyl laurate, n-decyl laurate, 3-methylbutyl myristate, cetyl myristate, isopropyl palmitate, neopentyl palmitate, nonyl palmitate, cyclohexyl palmhnitate, n-butyl stearate, 2-methylbutyl stearate, stearyl behenate 3,5,5-trimethylhexyl stearate, n-undecyl stearate, pentadecyl stearate, stearyl stearate, cyclohexylmethyl stearate, isopropyl behenate, hexyl behenate, lauryl behenate, behenyl behenate, cetyl benzoate, stearyl p-tert-butylbenzoate, dimyristyl phthalate, distearyl phthalate, dimyristyl oxalate, dicetyl oxalate, dicetyl malonate, dilauryl succinate, dilauryl glutarate, diundecyl adipate, dilauryl azelate, di-n-nonyl sebacate, 1,18-dineopentyloctadecylmethylenedicarboxylate, ethylene glycol dimyristate, propylene glycol dilaurate, propylene glycol distearate, hexylene glycol dipalmitate, 1,5-pentanediol dimyristate, 1,2,6-hexanetriol trimyristate, 1,4-cyclohexanediol didecanoate, 1,4-cyclohexanedimethanol dimyristate, xylene glycol dicaprate, and xylene glycol distearate.

Ester solvents can be selected from esters of a saturated fatty acid with a branched aliphatic alcohol, esters of an unsaturated fatty acid or a saturated fatty acid having one or more branches or substituents with an aliphatic alcohol having one or more branches or 16 or more carbon atoms, cetyl butyrate, stearyl butyrate, and behenyl butyrate including 2-ethylhexyl butyrate, 2-ethylhexyl behenate, 2-ethylhexyl myristate, 2-ethylhexyl caprate, 3,5,5-trimethylhexyl laurate, 3,5,5-trimethylhexyl palmitate, 3,5,5-trimethylhexyl stearate, 2-methylbutyl caproate, 2-methylbutyl caprylate, 2-methylbutyl caprate, 1-ethylpropyl palmitate, 1-ethylpropyl stearate, 1-ethylpropyl behenate, 1-ethylhexyl laurate, 1-ethylhexyl myristate, 1-ethylhexyl palmitate, 2-methylpentyl caproate, 2-methylpentyl caprylate, 2-methylpentyl caprate, 2-methylpentyl laurate, 2-methylbutyl stearate, 2-methylbutyl stearate, 3-methylbutyl stearate, 2-methylheptyl stearate, 2-methylbutyl behenate, 3-methylbutyl behenate, 1-methylheptyl stearate, 1-methylheptyl behenate, L-ethylpentyl caproate, 1-ethylpentyl palmitate, L-methylpropyl stearate, 1-methyloctyl stearate, 1-methylhexyl stearate, 1,1dimethylpropyl laurate, 1-methylpentyl caprate, 2-methylhexyl palmitate, 2-methylhexyl stearate, 2-methylhexyl behenate, 3,7-dimethyloctyl laurate, 3,7-dimethyloctyl myristate, 3,7-dimethyloctyl palmitate, 3,7-dimethyloctyl stearate, 3,7-dimethyloctyl behenate, stearyl oleate, behenyl oleate, stearyl linoleate, behenyl linoleate, 3,7-dimethyloctyl erucate, stearyl erucate, isostearyl erucate, cetyl isostearate, stearyl isostearate, 2-methylpentyl 12-hydroxystearate, 2-ethylhexyl 18-bromostearate, isostearyl 2-ketomyristate, 2-ethylhexyl-2-fluoromyristate, cetyl butyrate, stearyl butyrate, and behenyl butyrate.

Examples of the alcohol solvents include monohydric aliphatic saturated alcohols such as decyl alcohol, undecyl alcohol, dodecyl alcohol, tridecyl alcohol, tetradecyl alcohol, pentadecyl alcohol, hexadecyl alcohol, heptadecyl alcohol, octadecyl alcohol, eicosyl alcohol, behenyl alcohol and docosyl alcohol; aliphatic unsaturated alcohols such as allyl alcohol and oleyl alcohol, alicyclic alcohols such as cyclopentanol, cyclohexanol, cyclooctanol, cyclododecanol, and 4-tert-butylcyclohexanol; aromatic alcohols such as 4-methylbenzyl alcohol and benzhydrol; and polyhydric alcohols such as polyethylene glycol. Examples of the acid amides include acetamide, propionamide, butyramide, capronamide, caprylamide, capric amide, lauramide, myristamide, palmitamide, stearamide, behenamide, oleamide, erucamide, benzamide, capronanilide, caprylanilide, capric anilide, lauranilide, myristanilide, palmitanilide, stearanilide, behenanilide, oleanilide, erucanilide, N-methylcapronamide, N-methylcaprylamride, N-methyl (capric amide), N-methyllauramide, N-methylmyristamide, N-methylpalmitamide, N-methylstearamide, N-methylbehenamide, N-methyloleamide, N-methylerucanmide, N-ethyllauramide, N-ethylmyristanlide, N-ethylpalmitamide, N-ethylstearamide, N-ethyloleamide, N-butyllauramide, N-butylmyristamide, N-butylpalmitamide, N-butylstearamide, N-butyloleamide, N-octyllauramide, N-octylmyristamide, N-octylpalmitanide, N-octylstearamide, N-octyloleamide, N-dodecyllauramide, N-dodecylmyristamnide, N-dodecylpalmitamide, N-dodecylstearamide, N-dodecyloleamide, dilauroylamine, dimyristoylamine, dipalmitoylamine, distearoylamine, dioleoylamine, trilauroylamine, trimyristoylamine, tripalmitoylamine, tristearoylamine, trioleoylamine, succinamide, adipanmide, glutaramide, malonamide, azelamide, maleamide, N-methylsuccinamide, N-methyladip amide, N-methylglutaramide, N-methylmalonamide, N-methylazelamide, N-ethylsuccinamide, N-ethyladipamide, N-ethylglutaramide, N-ethylmalonamide, N-ethylazelamide, N-butylsuccinamide, N-butyladipamide, N-butylglutaramide, N-butylmalonamide, N-octyladipamide, and N-dodecyladipamide.

Among these solvents, it has been discovered that certain solvents have the effect of reducing the hysteresis window. The solvent may be material combined with the thermochromic system, for example, to reduce thermal separation across the hysteresis window to a level demonstrating 80%, 70%, 50%, 40%, 30% or less of the thermal separation that would exist if the co-solvent were not present. The co-solvent is selected from the group consisting of derivatives of mysristic acid, derivatives of behenyl acid, derivatives of palmytic acid and combinations thereof. Generally, these materials include myristates, palmitates, behenates, together with myristyl, stearyl, and behenyl materials and certain alcohols. In one aspect, these materials are preferably solvents and co-solvents from the group including isopropyl myristate, isopropyl palmitate, methyl palmitate, methyl stearate, myristyl myristate, cetyl alcohol, stearyl alcohol, behenyl alcohol, stearyl behenate, and stearamide. These co-solvents are added to the encapsulated thermochromic system in an amount that, for example, ranges from 9% to 18% by weight of the thermochromic system as encapsulated, i.e., excluding the weight of the capsule. This range is more preferably from about 12% to about 15% by weight.

Light Stabilizers

Thermochromic inks containing leuco dyes are available for all major ink types such as water-based, ultraviolet cured and epoxy. The properties of these inks differ from process inks. For example, most thermochromic inks contain the thermochromic systems as microcapsules, which are not inert and insoluble as are ordinary process pigments. The size of the microcapsules containing the thermochromic systems ranges typically between 3-5 μm which is more than 10-times larger than regular pigment particles found in most inks. The post-print functionality of thermochromic inks can be adversely affected by ultraviolet light, temperatures in excess of 140° C. and aggressive solvents. The lifetime of these inks is sometimes very limited because of the degradation caused by exposure to ultraviolet light from sunlight.

In other instances, additives used to fortify the encapsulated thermochromic systems by imparting a resistance to degradation by ultraviolet light by have a dual functionality of also reducing the width of separation over the hysteresis window. Light stabilizers are additives which prevent degradation of a product due to exposure to ultraviolet radiation. Examples of light stabilizers used in thermochromic systems of the present disclosure and which may also influence the hysteresis window include but are not limited to: avobenzone, bisdisulizole disodium, diethylaminohydroxybenzoyl hexyl benzoate, Ecamsule, methyl anthranilate, 4-aminobenzoic acid, Cinoxate, ethylhexyl triazone, homosalate, 4-methylbenzylidene camphor, octyl methoxycinnamate, octyl salicylate, Padimate O, phenylbenzimidazole sulfonic acid, polysilicone-15, trolamine salicylate, bemotrizinol, benzophenones 1-12, dioxybenzone, drometrizole trisiloxane, iscotrizinol, octocrylene, oxybenzone, sulisobenzone, bisoctrizole, titanium dioxide and zinc oxide.

Careful preparation of encapsulated reversible thermochromic material enhances coating stability in the presence of low molecular weight polar solvents that are known to adversely affect thermochromic behavior. One skilled in the art of microencapsulation can utilize well-known processes to enhance the stability of the microcapsule. For example, it is understood that increasing the cross linking density will reduce the permeability of the capsule wall, and so also reduces the deleterious effects of low molecular weight solvents. It is also commonly understood that, under certain conditions, weak acids with a pKa greater than about 2 may catalyze microcapsule wall polymerization and increase the resulting cross linking density. It is presently the case that using formic acid as a catalyst enhances solvent stability of blue thermochromic microcapsules in the presence of low molecular weight ketones, diols, and aldehydes at room temperature. Further, it is well understood that increasing the diameter of the thermochromic microcapsule can result in enhanced solvent stability.

The selection of material for use as the non-polar solvent for the thermochromic dye and color developer that is encapsulated within the thermochromic pigment determines the temperature at which color change is observed. For example, changing the solvent from a single component to a two component solvent system can shift the temperature at which full color is perceived almost 7° C. from just under 19° C. to 12° C. The present disclosure shows how to apply this knowledge in preparing resin-based vehicle coatings for use in can and coil coatings with full color temperatures, i.e., the temperature at which maximum color intensity is observed, as low as −5° C. and as high as 65° C. No adverse effects on the physical properties of the resulting coating were observed as the full color temperature was changed over the above range by the use of different straight chain alkyl esters, alcohols, ketones or amides.

Thermochromic materials including encapsulated thermochromic systems with a variety of color properties may be purchased on commercial order from such companies as Chromatic Technologies, Inc., of Colorado Springs, Colo.

Control over observed color intensity is demonstrated in several ways, generally by providing increased amounts of pigment. For a typical coating, material thickness ranges from 1 mg/in2 to 6 mg/in2. Very intense color is observed for coatings with thickness greater than about 3 mg/in2. Increasing thermochromic pigment solids can also result in a more intense observed color even when coating thickness is decreased. However, dried film properties such as flexibility and toughness may be compromised if too much thermochromic pigment is incorporated. The optimal range of thermochromic pigment solids is within 5 to 40% by weight of the coating.

Vehicle

Physical properties of the finished coating can be significantly affected by the selection of resin to be used. When no resin is used in formulating a reversible thermochromic coating, a matte finish is achieved that is able to be formed into can ends, tabs, caps and/or other closures. While this result may be desired, the inclusion of a low viscosity, relatively low molecular weight resin, monomer, oligomer, polymer, or combination thereof, can enhance gloss and affect other physical film properties such as hardness, flexibility and chemical resistance. The resin is designed to supplement the total solids deposited on the substrate, thus impacting the physical properties of the dried film. Any resin material, monomer, oligomer, polymer, or combination thereof that can be polymerized into the commercially available can and coil coating material is suitable for inclusion in the formulation of the current reversible thermochromic can and coil coating. Acceptable classes of resins include, but are not limited to polyester, urethane, acrylic acid and acrylate, or other types of resin systems with suitably high solids content.

Encapsulation Process

Nearly all thermochromic systems require encapsulation for protection. As is known in the art, the most common process for encapsulation is interfacial polymerization. During interfacial polymerization the internal phase (material inside the capsule), external phase (wall material of the capsule) and water are combined through high-speed mixing. By controlling all the temperature, pH, concentrations, and mixing speed precisely, the external phase will surround the internal phase droplet while crosslinking with itself. Usually the capsules are between 3-5 μm or smaller. Such small sizes of capsules are referred to as microcapsules and the thermochromic system within the microcapsules are microencapsulated. Microencapsulation allows thermochromic systems to be used in wide range of materials and products. The size of the microcapsules requires some adjustments to suit particular printing and manufacturing processes.

The size distribution of microcapsules can range from as much as 0.2 μm to 100 μm. Further example techniques of physical microencapsulation include but are not limited to pan coating, air suspension coating, centrifugal extrusion, vibration nozzle, and spray drying. Examples of chemical microencapsulation techniques include but are not limited to interfacial polymerization, in-situ polymerization, and matrix polymerization. Example polymers used in the preferred chemical microencapsulation include but are not limited to polyester, polyurethane, polyureas, urea-formaldehyde, epoxy, melamine-formaldehyde, polyethylene, polyisocyanates, polystyrene, polyamides, and polysilanes.

The capsule isolates the thermochromic system from the environment, but the barrier that the capsule provides is itself soluble to certain solvents. Therefore, the microcapsule constituents interact with the environment to some extent. The solubility parameter describes how much a material will swell in the presence of different solvents. This swelling will directly impact the characteristics of the reaction potential within the capsule, as well as potentially making the capsule more permeable, both of which will likely adversely affect the thermochromic system. Solvents in which the microcapsules are exposed to are chosen so as not to destroy, or affect, the thermochromic system within.

The capsule is hard, thermally stable and relatively impermeable. The infiltration of compounds through the capsule are stopped or slowed to the point that the characteristics of the dye are not affected. The pollution of the thermochromic system within the capsule by solvents from the environment affects the shelf life of the thermochromic system. Therefore, the formulation of the applied thermochromic system, as an ink for example, should be carefully considered.

In an embodiment of the present disclosure, capsules are made from urea formaldehyde. One technique used to produce the encapsulated thermochromic systems is to combine water, dye, oil, and urea formaldehyde and mix to create a very fine emulsification. Because of the properties of the compounds, the oil and dye end up on the inside of the capsule and the water ends up on the outside, with the urea formaldehyde making up the capsule itself. The capsule can then be thermo-set, similar to other resins, such as formica. The thermo-set substance is very hard and will not break down, even at temperatures higher than the encapsulated thermochromic system is designed to be exposed to. The urea formaldehyde capsule is almost entirely insoluble in most solvents, but it is permeable to certain solvents that might destroy the ability of the thermochromic system to color and decolorize throughout a temperature range.

The extent to which capsules will react with their environment is influenced by the pH of the surrounding medium, the permeability of the capsule, the polarity and reactivity of compounds in the medium, and the solubility of the capsule. Preferred media used in formulating encapsulated thermochromic system are engineered to reduce the reactivity between that medium and the capsules to a low enough level that the reactivity will not influence the characteristics of the dye for an extended period of time.

Highly polar solvent molecules, with the exception of water, often interact more with the leuco dye than with the capsule shell and other non-polar molecules of the thermochromic system. Therefore, polar solvents that are able to cross the capsule barrier should, in general, be eliminated from the medium within which the encapsulated thermochromic system is formulated.

Aqueous media that the encapsulated thermochromic systems are placed within should have a narrow pH range from about 6.5 to about 7.5. When an encapsulated thermochromic system is added to a formulation that has a pH outside this range, often the thermochromic properties of the system are destroyed. This is an irreversible effect.

One aspect of the present disclosure is for a method of improving the formulations of the thermochromic system by removing any aldehydes, ketones, and diols and replacing them with solvents which do not adversely affect the thermochromic system. Solvents having a large molecular weight (i.e. greater than 100) generally are compatible with the thermochromic systems. The acid content of the system is preferably adjusted to an acid number below 20 or preferably adjusted to be neutral, about 6.5-7.5. Implementing these solvent parameters for use in the thermochromic system will preserve the reversible coloration ability of the leuco dyes.

Formulations for thermochromic systems are engineered with all the considerations previously mentioned. The examples below describe a thermochromic system with excellent color density, low residual color, narrow temperature ranges between full color and clearing point, and a narrow hysteresis window. The full color point and the clearing point are determined by visual inspection of the thermochromic system at a range of temperatures. The difference in temperature between the maxima of color change during the cooling cycle and the heating cycle is used to calculate hysteresis.

Adjusting the Acid Content

Water-based inks are pH adjusted prior to addition of thermochromic pigment. As mentioned above, the pH should be neutral unless observation indicates that a different pH is required. To achieve the correct pH, one uses a good proton donor or acceptor, depending on whether the pH is to be adjusted up or down. To lower the pH, sulfuric acid is used, to raise it, the best proton acceptor so far is KOH. These two chemicals are very effective and do not seem to impart undesirable characteristics to the medium. The most effective pH is about 7.0, however, some tolerance has been noted between 6.0 and 8.0. A pH below 6.0 and above 8.0 has almost always immediately destroyed the pigment.

The acid value is defined as the number of milligrams of a 0.1 N KOH solution required to neutralize the alkali reactive groups in 1 gram of material under the conditions of ASTM Test Method D-1639-70. It is not yet fully understood how non-aqueous substances containing acid affect the thermochromic, but high acid number substances have inactivated the thermochromic pigments. Generally, the lower the acid number the better. To date ink formulations with an acid value below 20 and not including the harmful solvents described above have worked well. Some higher acid value formulations may be possible but generally it is best to use vehicle ingredients with low acid numbers or to adjust the acid value by adding an alkali substance. The greatest benefit of a neutral or low acid value vehicle will be increased shelf life. Buffers have been used historically in offset ink formulations to minimize the effects of the fountain solution on pigment particles. This is one possible solution to the potential acidity problem of the varnishes. One ingredient often used as a buffer is cream of tartar. A dispersion of cream of tartar and linseed oil can be incorporated into the ink. The net effect is that the pigments in the ink are protected from the acidic fountain solution.

Ink Formulations

The encapsulated thermochromic systems of the present disclosure may be referred to as pigments. In order to add normal pigment to ink, dye, or lacquer, the pigment itself is ground into the base. This disperses the pigment throughout the base. The addition of more pigment intensifies the color. Since the pigment often has a very intense color, it is sometimes acceptable for only about 10% of the final ink to be made up of normal pigments.

A base for an ink formulation using encapsulated thermochromic systems of the present disclosure may be developed using off the shelf ingredients. The ink will incorporate, where possible, and be compatible with different ink types and solvents with molecular weights larger than 100 while avoiding aldehydes, diols, ketones, and, in general, aromatic compounds. Important considerations with respect to the ingredients within the ink vehicle are the reactivity of the ingredients with the encapsulated thermochromic system.

Unwanted interactions between media and the encapsulated thermochromic systems can occur between compounds found in ink formulations. The long alkyl chains of many of the compounds found in ink vehicles may have reactive portions that can fit through the pores of the capsule and interact with the inner phase and denature it through this interaction. Since the behavior of the thermochromic system is related to the shape and the location of its molecules at given temperatures, disrupting these structures could have a large impact on the characteristics of the thermochromic system. Even molecules that cannot fit through the capsule pores may have reactive portions that could protrude into the capsule and thereby influence the color transition of the thermochromic system within the capsule. Therefore, mineral spirits, ketones, diols, and aldehydes are preferably minimized in any medium in which the encapsulated are also preferably avoided. If these compounds are substantially reduced or eliminated the thermochromic systems will perform better and have a longer shelf life.

Another important step in using the encapsulated thermochromic systems of the present disclosure in ink formulations is to adjust the pH or lower the acid value of the ink base before the thermochromic system is added. This can be done by ensuring that each individual component of the base is at the correct pH or acid value or by simply adding a proton donor or proton acceptor to the base itself prior to adding the thermochromic system. The appropriate specific pH is generally neutral, or 7.0. The pH will vary between 6.0 and 8.0 depending on the ink type and the color and batch of the thermochromic system.

Once a slurry and the base have been properly prepared, they are combined. The method of stirring should be low speed with non-metal stir blades. Other additives may be incorporated to keep the thermochromic system suspended. The ink should be stored at room temperature.

Most thermochromic pigments undergo a color change from a specific color to colorless. Therefore, layers of background colors can be provided under thermochromic layers that will only be seen when the thermochromic pigment changes to colorless. If an undercoat of yellow is applied to the substrate and then a layer containing blue thermochromic pigment is applied the color will appear to change from green to yellow, when what is really happening is that the blue is changing to colorless.

The substrates that the thermochromic inks are printed upon are preferably neutral in pH, and should not impart any chemicals to the capsule that will have a deleterious effect on it.

Thermochromic inks or coatings contain, in combination, a vehicle and a pigment including thermochromic microcapsules. The thermochromic microcapsules are preferably present in an amount ranging from 1% to 50% of the ink by weight on a sliding scale relative to other pigments. The vehicle contains a solvent that is preferably present in an amount ranging from 25% to 75% by weight of the coating.

The aqueous pigment slurries have particle sizes less than 5 microns and when drawn-down on ink test paper and dried, the pigment coating shows reversible thermochromic properties when cooled to the solidification point of the fatty ester, alcohol, amide, or a blend designed to obtain a specific temperature for full color formation. Such pigments can be designed to have a range of temperature for transition from full absorption temperature (full absorption color or UVA absorption point) to no color or no UVA absorption temperature (clearing point) of 2-7° C. The pigments are very useful for manufacture of ink, coating, and injected molded plastic products by spray drying prior to formulation into inks or coating compositions or extrusion into thermoplastic polymers to produce pellet concentrates for manufacture of injection molded thermochromic plastic products such as cups, cup lids, jars, straws, stirrers, container sleeves, shrink wrap labels. For example, thermochromic compositions were identified that permit generation of high quality saturated photographic quality yellow color that is very useful to formulate new orange, red, and green colors by mixing with magenta and/or cyan thermochromic pigments or by initial co-encapsulation of the yellow leuco dye with magenta and/or cyan leuco dyes and appropriate color developers during the pigment manufacture. Alternatively leuco pigments were identified that can change from absorption mainly in the region from 280 to 350 nm to absorption mainly from 350 to 400 nm. In an embodiment, this leuco dye can be used in a photochromic gel ink pen as disclosed above.

Ball-Point Pens

Ball-point pens employing the thermochromic inks disclosed herein may be used in a conventional ball-point pen mechanism or marker.

The thermochromic inks disclosed herein are endowed with thixotropic properties. The thermochromic inks disclosed herein have a high viscosity when left to stand without application of shear stress and is stably held in the ball-point pen mechanism, and only the ink around the ball becomes low viscous at the time of writing because of the high shear force attributable to the ball that rotates at a high speed, so that the ink smoothly passes through a gap between the ball and a ball holder by capillary action and is transferred to the paper surface. The ink transferred to the paper surface or the like is released from shear force and hence again brought into a highly viscous state, not causing the feathering in writing.

The thermochromic ink compositions disclosed herein satisfies properties suited for ball-point pen inks, can be free from line splitting, blurs and blobbing in writing, has stable viscosity characteristics with time, and satisfies practical performances as water-based ball-point pen inks containing various colorants. As the colorants, pigments and dyes of various types can be used, and hence ball-point pens having a variety in color tones can be provided. Also, in the system where the thermochromic microcapsular pigment material is used as the colorant, convenient ball-point pens that can give thermochromic written images can be provided, promising the spread of new uses. Such applicable uses and advantages attributable thereto will be exemplified below.

In an embodiment, confidential images such as letters and pictures that cause metachromatism at temperature lower than the room temperature can be formed on post cards, Christmas cards, greeting cards and so forth. Thus, the images may be made to come into sight when cooled, so as to be applicable to magical use, or images that can alternately change from color (A) to color (B) may be formed so that the metachromatism may be caused by body temperature, hand temperature, or other heat source.

In another embodiment, thermochromic inks disclosed herein are capable of forming color only when it is cold, e.g., at a metachromatic temperature of 10° C., or a thermochromic pigment material having hysteresis characteristics in a wide temperature range, images that cannot be read at room temperature can be recorded, using the ball-point pen of the present disclosure as a confidential pen. Thus, the pen can be used to write memos or the like that must be made confidential.

In another embodiment, pens using the thermochromic inks disclosed herein can be used for learning in school or the like, e.g., for questions, tests, drills, blank maps and English translations, where necessary answers or remarks are written and the written information is erased by heating so that again the problems or the like can be engaged in the state completely reset to have neither answers nor memos.

In another embodiment, pens using the thermochromic inks disclosed herein can be used for temperature indication as if it functions as a thermometer. A set of thermochromic ink ball-point pens having different metachromatic temperature may be provided so that various images are formed to make them function as temperature detectors. Thus, the ink composition of the present invention can be used in not only toys and stationery but also in a variety of industrial fields, e.g., can be conveniently used in temperature control of reaction tanks, temperature control of processing steps, indication for suitable temperature control of low-temperature circulation food, display for preventing overheat due to short of electric code outlets.

In another embodiment, the thermochromic inks disclosed herein can be used in articles of clothing, illustrations or pictures may be drawn on casual wear such as T-shirts with a 30° C.-metachromatic thermochromic ink ball-point pen so that users themselves can design T-shirts capable of causing metachromatism utilizing a temperature difference between the outdoors and the room in the summer season. This can also be applied to gloves, shoes, hats or caps, ski wear and swimming suits.

In another embodiment, pens using the thermochromic inks disclosed herein can be used for preventing forgery, genuine things and imitations can be discriminated by cooling or heating. For example, some information may be handwritten with the ball-point pen of the present disclosure in tickets, merchandize bonds, coupon tickets and so forth on a scale of private concerns or small lots. This can effectively prevent forgery.

In another embodiment, pens using the thermochromic inks disclosed herein can be used in combination with usual non-metachromatic ink ball-point pens so that the state of changes can be in more variety.

The present disclosure provides thermochromic inks for use in a shear-thinning ball-point pen. In an embodiment, the thermochromic ink compositions have a viscosity within the range of from about 25 mPas to about 160 mPas and a shear thinning index adjusted within the range of from about 0.1 to about 0.6.

The non-limiting embodiments that follow teach by way of example and should not be construed as unduly limiting the scope of this disclosure.

In one aspect, a reversible thermochromic ink for use in pens contains a reversible thermochromic pigment in an amount from 1% to 40% by weight of the coating, and a vehicle forming the balance of the coating. The vehicle including a resin selected from the group consisting of polyester, urethane, acrylic acid and acrylate resins, and combinations thereof.

Commercially available thermochromic pigments may be readily obtained in a variety of colors demonstrating color transition temperatures from about 5° C. and up to about 65° C. A range of color formulations may be made by mixing the pigment to include one or more of the following reversible thermochromic colors: yellow, magenta, cyan, and black. These may be further mixed to include other dyes or solid pigments that are non-thermochromic in nature. The pigment may change from a colorless state to a colored state upon cooling to the reactive temperature, or to a colored state upon heating to the reactive temperature. It is preferred that the microcapsules are formed of urea formaldehyde or melamine formaldehyde that is acid catalyzed to enhance the inherent stability in polar, low molecular weight solvents having a molecular weight of about less than 100 g/mol.

Thermochromic Inks Used in Pens

In an embodiment, thermochromic inks of the present disclosure contain microencapsulated leuco dye, developer, and solvent with the appropriate solvency and melting point to achieve the temperature activated color change. In an embodiment, the base colorant is a permanently colored pigment or dye that is suspended in the ink formulation, or soluble in the ink formulation.

In an embodiment, the shear thinning ink may be formulated using a film forming compound such as ethylene maleic anhydride or an equivalent substitute fully hydrolyzed in water and adjusted to the desired thixotropic behavior with xanthan gum. The film forming properties of the ink could be achieved using many resins/vehicles such as ethylene maleic anhydride, styrene acrylonitrile polymers, acrylic emulsions, or urethane emulsions for example. The rheology to achieve the viscosity and shear thinning ability could be controlled by surfactants and agents such as xanthan gum and hydroxyl ethyl cellulose as well as a number of others.

In an embodiment, the temperature between full color development and clearing point activation can be engineered with a mixture of alkyl esters such as methyl palmitate, methyl stearate, isopropyl palmitate, stearyl behenate, and behenyl alcohol to produce the following color to color effects, for example: a full color development between 23° C. and 27° C. and color clearing between 27° C. and 33° C. for easily activated reversible thermochromic color to color options.

In an embodiment, ball-point pen and gel-ink pens disclosed herein use thermochromic inks that transition from one color to another color, or from color to colorless, when activated at about body temperature or at about room temperature.

Strong color to color transition and color to colorless examples are as follows:

| | | |
|---|---|---|
| Purple to pink | Blue thermochromic + | pink/red base color |
| Green to yellow | Blue thermochromic + | yellow base color |
| Orange to yellow | Red thermochromic + | yellow base color |
| Burgundy to blue | Red thermochromic + | blue base color |
| Brown to green | Red thermochromic + | green base color |
| Green to blue | Yellow thermochromic + | blue base color |
| Orange to pink | Yellow thermochromic + | pink/red base color |
| Blue to colorless | Blue thermochromic + | white/clear base color |
| Black to colorless | Black thermochromic + | white/clear base color |

The above embodiments of color to color options are achieved by mixing different ratios of thermochromic microcapsules with standard colored bases, as described herein. The base colorants may be pigments or dyes that are compatible in the ink formulation.

The color to color transitions sometimes lack high contrast between the color developed state and the base color. In order to increase contrast, black to color transition inks are herein disclosed.

In an embodiment, black to color transitions use blue/cyan, red/magenta, yellow, and black thermochromics with red/magenta, blue/cyan, yellow, and white base colorants. Examples of thermochromic inks having black to color transition are as follows:

| | | |
|---|---|---|
| Black to blue | Thermochromic magenta, black, yellow + | blue base |
| Black to yellow | Thermochromic magenta, black, blue + | yellow base |
| Black to red/pink | Thermochromic blue, yellow, black + | pink/magenta base |
| Black to orange | Thermochromic blue, black + | pink and yellow base |
| Black to green | Thermochromic magenta, black + | blue and yellow base |
| Black to violet | Thermochromic yellow, black + | blue and pink base |
| Black to brown | Thermochromic blue, black + | pink, yellow, blue base |

By mixing different ratios of thermochromic pigments with standard colored bases, a neutral black to almost any colored base is possible. These black to color transitions can be used to create black and white images that will change to colored states when heat activated.

Photochromic Ink Pens

In an embodiment, photochromic microcapsules can also be formulated by encapsulating photochromic dyes in resins, monomers, and polymers using standard encapsulating techniques to achieve a particle size between 300 nm and 5 microns. For example, in situ or interfacial polymerization using melamine resin, epoxy resin, or urea-formaldehyde may be used to encapsulate hydrophobic, water immiscible internal phase materials in which the dye is dissolved. Antioxidants, hindered amine light stabilizers, and UV absorbers may be used either alone or in combination with each other to enhance the UV stability of the system. The internal phase solvent may be maintained as a liquid, or polymerized to a solid within the microcapsule.

The microencapsulated photochromic systems then can be formulated into a water-based shear thinning gel ink for use in roller ball pens. Inks can be produced that are virtually invisible under normal fluorescent or incandescent lighting indoors, but which will develop vibrant colors under UV light such as natural sunlight. By mixing colored bases with the photochromic inks, color to color development is also possible. The shear thinning properties and film forming properties of the ink can be achieved using many resins/vehicles such as ethylene maleic anhydride, styrene acrylonitrile polymers, acrylic emulsions, or urethane emulsions for example.

The rheological manipulations to achieve the viscosity and shear thinning of the photochromic inks can be controlled by surfactants and agents such as xanthan gum, hydroxyl ethyl cellulose and various other agents well known in the art. The end result is a gel ink that flows from a roller ball pen smoothly so as to form a uniform ink line without starving or blobbing.

Embodiments of photochromic inks useful in pens include:

| | | |
|---|---|---|
| Colorless to Blue | Microencapsulated blue + | Clear gel base |
| Yellow to Green | Microencapsulated blue + | Yellow base color + Clear gel base |
| Colorless to Red | Microencapsulated red + | Clear gel base |
| Blue to Purple | Microencapsulated red + | Blue base color + Clear gel base |

Examples

Black to Green Temperature Memory Ink

A thermochromic ink composition, commercially available from Chromatic Technologies Inc., with full color between 12° C. and 15° C. and color clearing between 21° C. and 27° C. for a color to color option was made so that the color of the thermochromic portion of the ink was maintained up to room temperature, but easily activated by body temperature to a clearing point to reveal the base color.

The thermochromic ink was a composition consisting of a thermochromic blue dye with a magenta leuco dye, and a developer to achieve a reversible thermochromic system with a full color development around 12° C. and a clearing temperature of 25° C. Magenta thermochromic capsules were incorporated into a water-based shear thinning gel ink with a neon blue pigmented gel ink and a neon yellow pigmented gel ink.

The shear thinning thermochromic ink was formulated using a film forming compound such as ethylene maleic anhydride fully hydrolyzed in water and adjusted to the desired thixotropic behavior with xanthan gum.

The result was an aqueous ink that appeared black when cooled to a temperature below 12° C. and remained black until heated to a temperature above 25° C. when it changed to a bright green color.

The thermochromic reversible color changing ink was injected into a standard 0.7 mm to 1.0 mm tip gel ink pen for transfer to a paper substrate.

In an embodiment, a drawing or written image could then be made that will appear black at room temperature. In an embodiment, the colored image may easily be activated to the bright orange by gentle rubbing and the black color can only be regained by cooling to a temperature around 12° C. for a few minutes.

The color to color options are achieved by mixing different ratios of thermochromic microcapsules with standard colored bases. The base colorants may be pigments or dyes that are compatible in the ink formulation. These color to color options are artistically pleasing, but are somewhat limited as far as high contrast between the color developed state and the base color. Thermochromic pigments are commercially available from Chromatic Technologies Inc. in Colorado Springs, Colo.

In order to achieve a maximum color effect for artistic reasons, neutral charcoal/black to color options are proposed. In one example that shows the mixing of colors, these thermochromic pigments:

blue/cyan, red/magenta, yellow, and black may be mixed
        with the following base colorants (pigments or dyes):
        red/magenta, blue/cyan, yellow, and white.
      Moreover, any neutral black to color option is achievable.

This is achieved by mixing different ratios of thermochromic pigments with standard colored bases. It is possible to achieve a neutral black to almost any colored base is possible. This allows full dramatic effect to such an extent that the user can create a black and white image that will change to the colored state when heat activated. For example, picture a natural setting of a tree on a hillside. The trunk of the tree will be black to brown, the leaves of the tree will be black to green, the sun will be black to orange and black to yellow, the grass on the hillside will be black to green, and clouds will be black to blue. By selectively choosing the black to color option, any scene can be depicted that will transition from the neutral black sketch to a fully colored sketch as it is heated.

The thermochromic component of the invention is a microencapsulated leuco dye, developer, and solvent with the appropriate solvency and melting point to achieve the temperature activated color change.

The base colorant is a permanently colored pigment or dye that is suspended in the ink formulation, or soluble in the ink formulation.

The temperature between full color development and clearing point activation can easily be engineered with a variety of internal phase solvents as described in a number of patents to achieve microencapsulated pigments with color development between −10 C and 65 C.

Example of Black to Orange

A microencapsulated pigment with an internal phase engineered with a blue leuco dye and a phenolic developer to achieve a reversible thermochromic system with a full color development between 23 C and 27 C and a clearing temperature between 28 C and 31 C (available from Chromatic Technologies, Inc.)

The red thermochromic capsules are incorporated into a water-based shear thinning gel ink with a neon pink pigmented gel ink and a neon yellow pigmented gel ink.

The shear thinning ink may be formulated using a film forming compound such as ethylene maleic anhydride fully hydrolyzed in water and adjusted to the desired thixotropic behavior with xanthan gum. The film forming properties of the ink could be achieved using many resins/vehicles such as ethylene maleic anhydride, styrene acrylonitrile polymers, acrylic emulsions, or urethane emulsions for example. The rheology to achieve the viscosity and shear thinning ability could be controlled by surfactants and agents such as xanthan gum and hydroxyl ethyl cellulose as well as a number of others.

A thermochromic ink composition, commercially available from Chromatic Technologies Inc., consisting of a thermochromic blue with a blue leuco dye and a developer to achieve a reversible thermochromic system with a full color development around 27° C. and a clearing temperature of 32° C. was produced. The blue thermochromic microcapsules were incorporated into a water-based shear thinning gel ink with a neon pink pigmented gel ink and a neon yellow pigmented gel ink.

The resulting thermochromic ink appeared black when below 27 C and gradually changed to a bright orange when heated to a temperature above 32 C.

The thermochromic reversible color changing ink was injected into a standard 0.7 mm to 1.0 mm tip gel ink pen for transfer to a paper substrate.

BLACK TO ORANGE COLOR CHANGING THERMOCHROMIC PEN/MARKER FORMULATION:

| Component | Amount (g) | wt % |
| --- | --- | --- |
| Ethylene maleic anhydride solution (10-20%) | 10-20 | 6.7-10 |
| Xanthan gum solution (0.25%) | 10-20 | 6.7-10 |
| Blue microcapsule slurry (40-50% capsule solids) | 30-40 | 26.7-30 |
| Black microcapsule slurry (40-50% capsule solids) | 10-20 | 6.7-10 |
| Pigmented yellow gel ink (20-30% pigment solids) | 20-25 | 16.7-20 |
| Pigmented pink gel ink (20-30% pigment solids) | 20-25 | 16.7-20 |
| Water-based anti-foaming surfactant | 0.5-1.0 | 0.25-0.5 |

The result is an ink that will appear black when below 27° C. and gradually change to a bright orange when heated to a temperature above 31° C.

The thermochromic reversible color changing ink is injected into a standard 0.7 mm to 1.0 mm tip gel ink pen for transfer to a paper substrate. As non-limiting examples the ink formulated can be for a ball point pen or a fibrous tip marker type writing instrument.

A Nonlimiting Example of a Purple to Pink Temperature Memory Ink:

Full color between 12° C. and 15° C. and color clearing between 21° C. and 27° C. for a color to color option so that the color of the thermochromic portion of the ink is maintained up to room temperature, but easily activated by body temperature to a clearing point to reveal the base color. A microencapsulated pigment engineered to have a wide hysteresis effect using a magenta dye and a phenolic developer to achieve a reversible thermochromic system with a full color development between 12-13° C. and a clearing temperature between 23-25° C.

The blue thermochromic capsules are incorporated into a water-based shear thinning gel ink with a neon pink pigmented gel ink.

The shear thinning ink is formulated using a film forming compound such as ethylene maleic anhydride fully hydrolyzed in water and adjusted to the desired thixotropic behavior with xanthan gum.

The result is an aqueous ink that will appear purple when cooled to a temperature below 12 C and will remain purple until heated to a temperature above 23-25° C., where it will then change to a bright pink color.

The thermochromic reversible color changing ink is injected into a standard 0.7 mm to 1.0 mm (or larger) tip gel ink pen for transfer to a paper substrate.

A drawing or written image can be made that will appear purple at room temperature (20-23 C). The colored image may easily be activated to the bright pink by gentle rubbing or heating. The purple color can only be regained by cooling to a temperature around 12° C. for a few seconds achievable by placing the printed image in a refrigerator set at normal conditions.

Photochromic Gel Ink Pen

Photochromic microcapsules can also be formulated by encapsulating photochromic dyes in resins, monomers, and polymers using standard encapsulating techniques to achieve microcapsules suitable for use as a pigment in a gel ink. For example, in situ or interfacial polymerization using melamine resin, epoxy resin, or urea-formaldehyde may be used to encapsulate hydrophobic, water immiscible internal phase materials in which the dye is dissolved. Antioxidants, hindered amine light stabilizers, and UV absorbers may be used either alone or in combination with each other to enhance the UV stability of the system. The internal phase solvent may be maintained as a liquid, or polymerized to a solid within the microcapsule. The microencapsulated photochromic systems then can be formulated into a water-based shear thinning gel ink for use in roller ball pens. Inks can be produced that are virtually invisible under normal fluorescent or incandescent lighting indoors, but which will develop vibrant colors under UV light such as natural sunlight. By mixing colored bases with the photochromic inks, color to color development is also possible. The shear thinning properties and film forming properties of the ink could be achieved using many resins/vehicles such as ethylene maleic anhydride, styrene acrylonitrile polymers, acrylic emulsions, or urethane emulsions for example. The rheology to achieve the viscosity and shear thinning ability could be controlled by surfactants and agents such as xanthan gum and hydroxyl ethyl cellulose and a number of others. The end result would be a gel ink that would flow from a roller ball pen smoothly so as to form a uniform ink line without starving or blobbing.

Clear Base Gel

The nonlimiting example that follows shows one embodiment for a clear base gel incorporating the instrumentalities described above. The clear gel base can be formulated as follows:

| Component | Amount (g) | wt % |
| --- | --- | --- |
| Ethylene maleic anhydride solution (10-20%) | 40-50 | 40-50 |
| Xanthan gum solution (0.25%) | 40-50 | 40-50 |
| Anti-foaming surfactant | 0.25-0.50 | 0.25-0.50 |

This may be mixed with pigment as follows. The amount of the pigment is added to suit the eye.

| | | |
|---|---|---|
| Colorless to Blue: | Microencapsulated blue + | Clear gel base |
| Yellow to Green: | Microencapsulated blue + | Yellow base color + Clear gel base |
| Colorless to Red: | Microencapsulated red + | Clear gel base |
| Blue to Purple: | Microencapsulated red + | Blue base color + Clear gel base |

In general 50-98% gel base is blended with 1-50% photochromic dye or microencapsulate photochromic dye, and 1-50% of a colored dye. Preferably, 60-95% mixed with 5-40% photochromic dye or microencapsulated dye, and 1-10% of a colored dye.

An example photochromic yellow to green pen/marker ink is:

90% gel base
5% photochromic microencapsulated pigment
5% Tartrazine dye

Additional temperature profiles with various degrees of color memory may be achieved with other internal phase materials such as tetradecanol, dodecyl decanoate, and decanophenone, where the color may be fully developed at a lower temperatures and maintained until some higher clearing point temperature.

The foregoing disclosure teaches by way of example, and not by limitation. Those skilled in the art will appreciate that what is claimed may be subjected to9insubstatial change with9ut departing form the scope and spirit of the invention. Accordingly, the inventors hereby state their intention to rely upon the doctrine of Equivalents, in order to protect their rights in the invention.

We claim:

1. A photochromic ink comprising:
   a photochromic dye susceptible to a light-modulated color change associated with photochromic dye first and second states; and
   a vehicle;
   wherein said photochromic ink is formulated for use with a writing instrument to form writing on a substrate;
   wherein said photochromic dye of said writing is colorless under normal fluorescent or incandescent light; and
   wherein said photochromic dye of said writing is colored under ultraviolet light.

2. The photochromic ink of claim 1, wherein said photochromic dye is encapsulated within a microcapsule to provide an encapsulated photochromic dye.

3. The photochromic ink of claim 2, wherein said encapsulated photochromic dye has a particle size in a range of between about 300 nanometers to about 5 microns.

4. The photochromic ink of claim 2, wherein said microcapsule comprises a resin selected from the group consisting of: melamine resin, epoxy resin, and urea-formaldehyde resin.

5. The photochromic ink of claim 1, wherein said vehicle is selected from the group consisting of: ethylene maleic anhydride, styrene acrylonitrile polymers, acrylic emulsions, and urethane emulsions.

6. The photochromic ink of claim 1, wherein said photochromic ink has a viscosity in a range of between about of 25 mPas to about 160 mPas.

7. The photochromic ink of claim 1, wherein said photochromic ink has a shear-thinning index in a range of between about 0.1 to about 0.6.

8. The photochromic ink of claim 1, wherein said photochromic ink is formulated as a gel ink.

9. The photochromic ink of claim 1, wherein said photochromic ink is formulated as a water-based shear-thinning gel ink.

10. The photochromic ink of claim 1, wherein said writing instrument is selected from the group consisting of: a gel-ink pen, a ball-point pen, a roller-ball pen, and a marker.

11. The photochromic ink of claim 1, wherein said photochromic dye reversibly transitions between said photochromic dye first and second states.

12. The photochromic ink of claim 1, further comprising:
   a non-photochromic colorant;
   wherein said photochromic dye and said non-photochromic colorant provide said photochromic ink with a first color when said photochromic dye is in said first state and wherein said photochromic dye and said non-photochromic colorant provide said photochromic ink with a second color when said photochromic dye is in said second state.

13. The photochromic ink of claim 12, wherein said non-photochromic colorant is selected from the group consisting of: a pigment, a dye, and a thermochromic compound.

14. The photochromic ink of claim 12, wherein said photochromic dye comprises about 1% to about 50% of said photochromic ink by weight.

15. The photochromic ink of claim 12, wherein said photochromic dye comprises about 5% to about 40% of said photochromic ink by weight.

16. The photochromic ink of claim 14, wherein said non-photochromic colorant comprises about 1% to about 50% of said photochromic ink by weight.

17. The photochromic ink of claim 14, wherein said non-photochromic colorant comprises about 1% to about 10% of said photochromic ink by weight.

18. The photochromic ink of claim 12, wherein said photochromic dye is encapsulated within a microcapsule to provide an encapsulated photochromic dye.

19. The photochromic ink of claim 18, wherein said encapsulated photochromic dye comprises about 1% to about 50% of said photochromic ink by weight.

* * * * *